Nov. 30, 1943.  T. W. MURRAY  2,335,692
SUPPORTING TABLE AND JACK
Filed Jan. 30, 1943   3 Sheets-Sheet 3
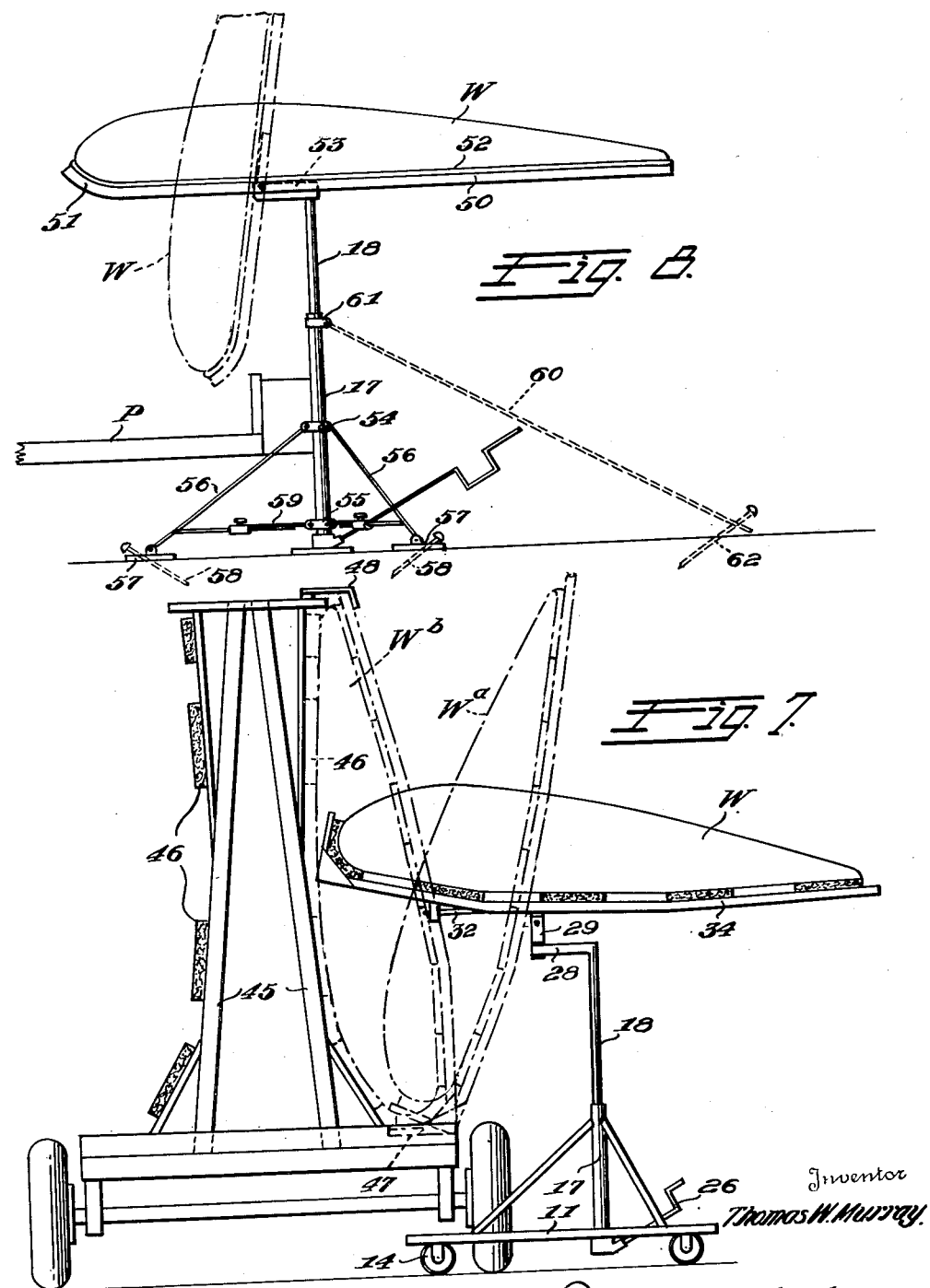

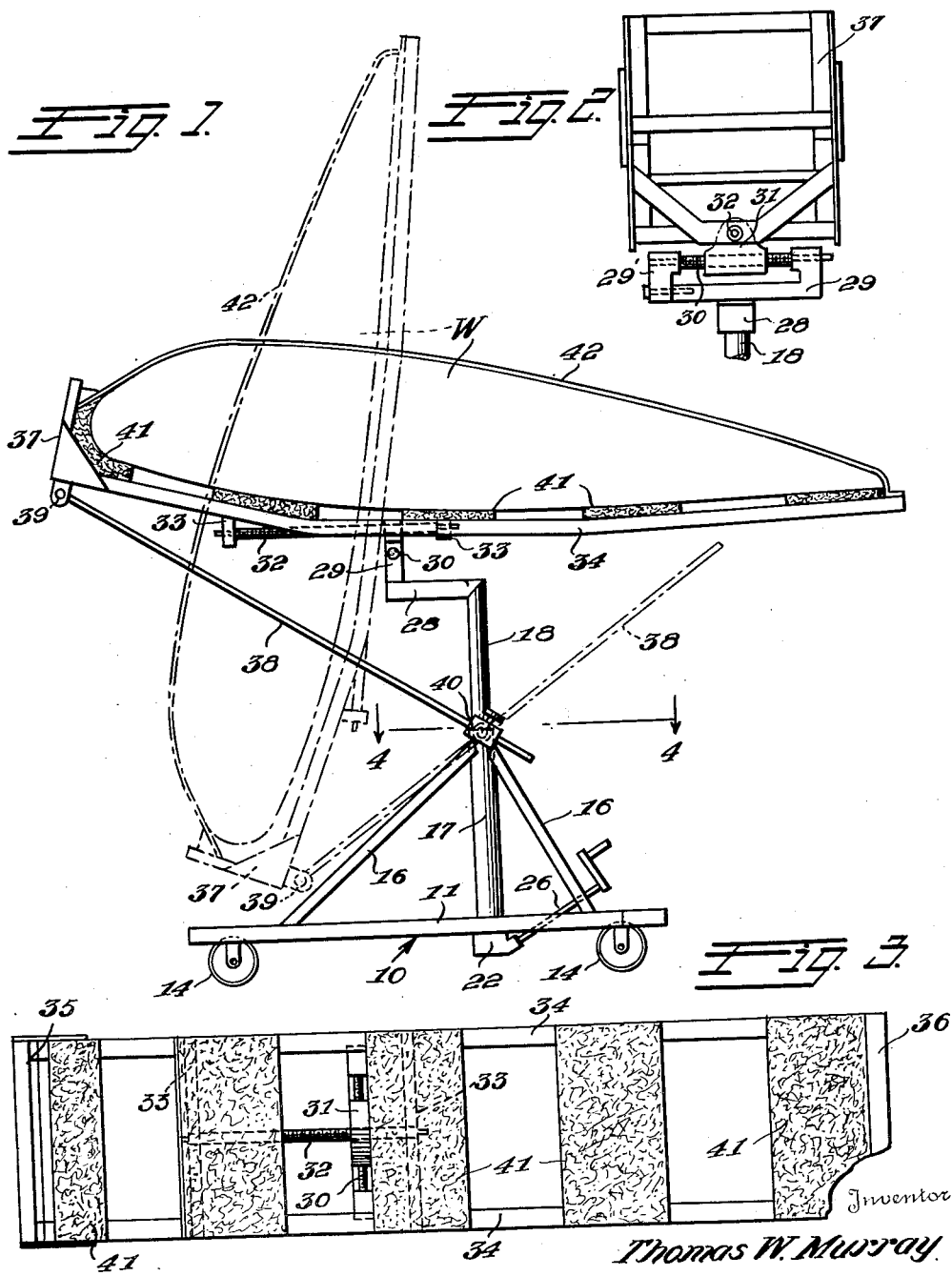

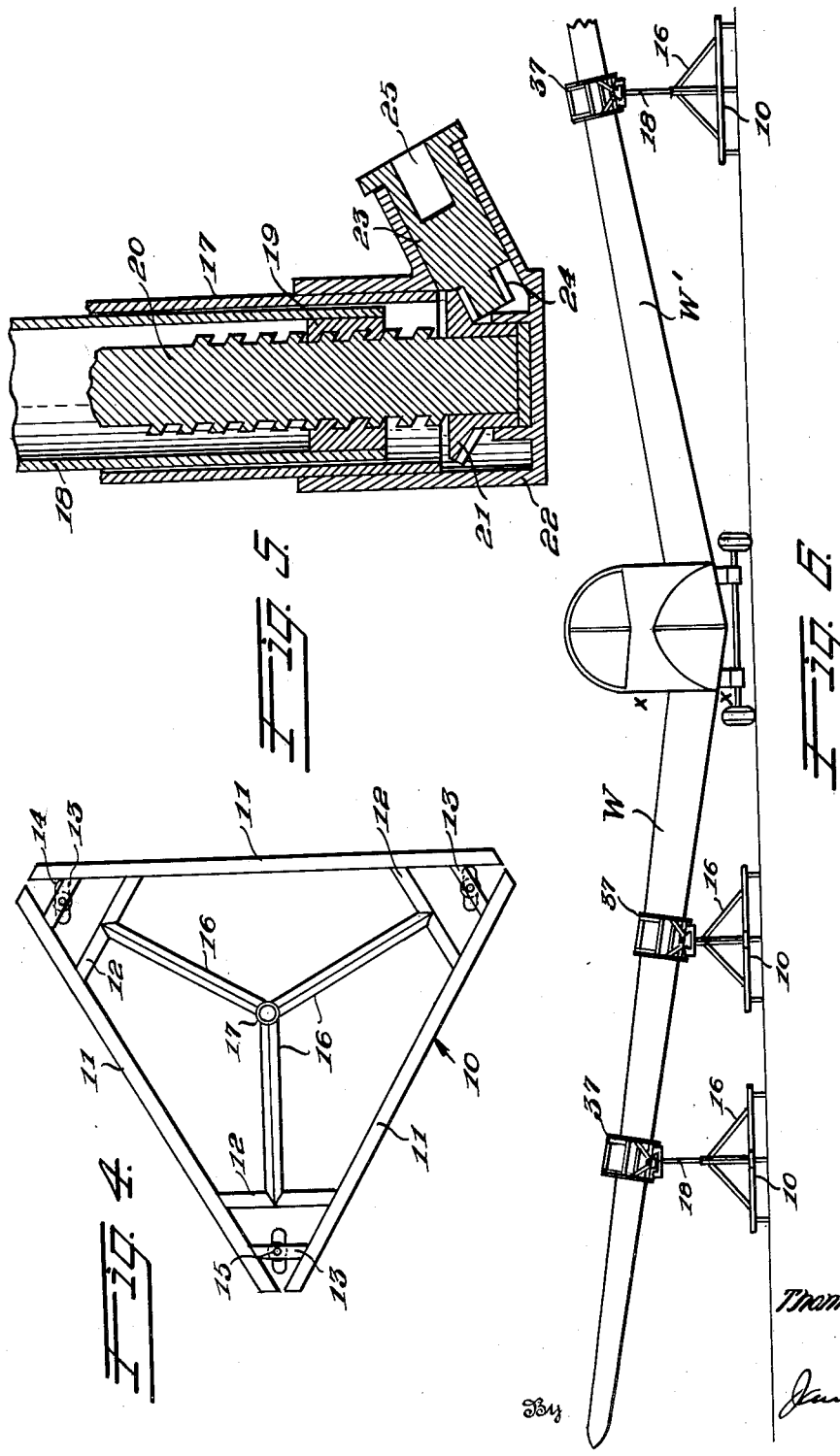

Patented Nov. 30, 1943

2,335,692

UNITED STATES PATENT OFFICE 2,335,692

SUPPORTING TABLE AND JACK

Thomas W. Murray, Dover, Del.

Application January 30, 1943, Serial No. 474,146

12 Claims. (Cl. 214—130)

This invention relates to a supporting table and jack for handling airplane parts.

A primary object of the invention is the provision of a combined supporting table and jack particularly adapted to the expeditious removal of wings from the fuselage of an airplane or glider, and for loading the wing onto a suitable transportation vehicle, as well as for a reverse procedure.

A further object of the invention is the provision of a combined supporting table and jack particularly designed for expeditious handling of large and bulky parts of airplanes, such as wings, stabilizers, elevators, outriggers, etc., the device being such that it is readily adapted for dismantling or assembling any of the above noted parts in factories, hangars, or repair shops as well as, in accordance with one embodiment thereof, on irregular terrain.

A still further object of the invention is the provision of an improved construction of the above-noted general character which is relatively simple in structure, strong and durable, as well as highly efficient in operation.

With these general objects in view and others that will appear as the nature of the invention is better understood, the same consists in the novel construction, combination, and arrangement of parts hereinafter more fully described, illustrated in the accompanying drawings, and pointed out in the claims.

In the accompanying drawings, forming part of the present disclosure,

Figure 1 is a side elevational view of the improved construction in accordance with a preferred embodiment thereof and disclosing two different operative positions thereof.

Fig. 2 is an enlarged front elevation of the supporting table.

Fig. 3 is a top plan view of the supporting table.

Fig. 4 is a horizontal sectional view as observed in the plane of line 4—4 in Fig. 1.

Fig. 5 is a partial vertical sectional view of the jack.

Fig. 6 is a more or less diagrammatic view in front elevation of an airplane showing the adaptation of several of the improved constructions illustrated in Fig. 1.

Fig. 7 is a view corresponding to Fig. 1, but further illustrating a transportation vehicle in operative association therewith.

Fig. 8 is a view similar to Fig. 1 depicting a modification of the invention.

Referring first to Fig. 1 in connection with Figs. 2 to 5 inclusive, the numeral 10 designates a base which as shown in Fig. 4 is preferably substantially triangular in form, comprising three frame members 11 connected adjacent the apices by inner and outer members 12 and 13, respectively. The base 10 is supported by wheels 14 which, as indicated at 15 in Fig. 4, are preferably swivelly connected to members 13 for universal movement of the frame on a supporting surface or floor.

Rigidly supported on the frame 10 in vertical position by means of braces 16 is a tubular column 17 within which is telescoped the lower end of a table supporting tubular column 18. The column 18 is vertically movable within the fixed column 17 for a distance sufficient for moving an airplane wing from an assembled position to a desired height for working on it or for loading it into a truck or trailer.

Movement of the column 18 may be effected by means of a common form of mechanical jack as illustrated in Fig. 5, and which comprises a nut 19 secured internally of the lower end of the column 18 and a screw 20 cooperating with the nut.

The screw 20 is proivded at the lower end thereof with a bevel gear 21 rotatably mounted in a casing 22 to which the lower end of column 17 is connected. Rotatably mounted in casing 22 at an oblique angle is a member 23 provided at its inner end with a pinion 24 meshing with the gear 21 and at its outer end with an angular aperture 25 for removably receiving a manipulating crank 26. Thus it will be seen that upon turning crank 26 in one or the other direction, the column 18 will be correspondingly raised or lowered for effecting a like movement of the table about to be described.

The column 18 is provided at its upper end with a right angular lateral extension 28 on the free end of which is supported a bearing member 29, 29' in which is rotatably supported the opposite ends of an adjusting screw 30.

The screw 30 extends through a nut member 31 through which is threaded a screw 32 having its opposite ends rotatably supported in cross bars 33 secured to the bottom of the supporting table.

The supporting table comprises a framework including side rails 34, front and rear end rails 35 and 36, and a front upright wing end support 37. In order to maintain the table at any desired angle relative to the column 18 when pivotally moved about the screw 30, a rod 38 may be pivotally connected to an eye 39 at the front end of the table with the opposite end of the rod extending through a thumb screw clamp 40 pivotally mounted on the column 17, as is indicated in Fig. 1.

The table frame supports spaced pads 41 for non-abrasive support of an airplane wing, and straps 42 are provided for rigidly supporting the wing in contact with the pads on the frame.

In the use of the improved construction as above described, two of the combined supporting table and jack constructions are placed under the wing W (Fig. 6) which it is desired to remove from the fuselage, a third construction being placed under the other wing W' in order to stabilize the plane after the first wing is removed.

When the desired points are chosen, the jacks or columns 18 are raised to make a firm contact of the supporting tables with the underside of the wing, after which the wing is unbolted from the fuselage along the line X—X.

The jacks are then rolled in a direction away from the fuselage about six inches, which pulls the wing attachment clevises apart from the fuselage. If bolts are difficult to withdraw or the clevises are hard to separate, the jacks are a great asset, as the wing can be raised or lowered on the jacks a fraction of an inch at a time until the right position is obtained, or the jacks can be alternately raised and lowered thereby vibrating the wing in order to break a stiff point.

After the wing is disconnected from the fuselage, the jacks are adjusted in height of columns 18 so that the wing is level with the ground and at a desired height for work to be done on it. After release of the wing the straps 42 are extended over the top of the wing to secure it firmly to the table. At this time the screw 32 is rotated to move the supporting table to a point where the wing's center of gravity is over or a little back of screw 30. This adjustment should be made roughly before the wing is detached and then final and more accurate adjustment done after the wing is on the tables. With the center of gravity near the screw 30 the wing can be easily swung up to a vertical position or any desired angle and held in that position by means of the rod 38 and clamp 40.

The screw 30 is utilized for moving the wing out from the fuselage, for separating the wing attachment clevises. This is necessary when the jacks cannot be easily rolled or under conditions where a stationary base may be used.

In the use of the improved construction in connection with transporting wings, etc., on trailers or trucks, a truck support (Fig. 7) 45 is provided having opposed faces padded as at 46 for conformity and engagement with the tops of airplane wings.

For loading a dismantled wing onto the trunk, the jack supporting the wing is rolled alongside of the truck, which can be driven up to the wing while it is in a horizontal position. The jack is then adjusted to the correct height for the truck and the wing is then swung over to the nearly vertical position indicated at W$^a$, allowing the front frame member 35 of the table to fall into a recess 47 on the truck frame. The floor of this recess is used as a pivot to swing the wing into engagement with the pads 46, as indicated at W$^b$, after the supporting table is disconnected from the jack which may be done in any suitable manner as upon removing bearing member 29'. The top end of the supporting table is then fastened to the support 45 by a suitable latch or other securing means 48. The other side of the support 45 may be loaded with the other wing.

In Fig. 8 is disclosed a modified embodiment of the invention and which is particularly designed for use on rough or hilly terrain where the center column of the jack can always be kept vertical for proper support of the wing. While the jack and supporting columns in this form may preferably be the same as the first form, the supporting table preferably embodies an elongated frame 50 having an upwardly curved front end 51, and the frame is covered by a single pad 52.

While the table is here shown as being pivotally connected with the column 18 by means of a hinge plate 53, the construction embodying the screws 30 and 32 of the first form may desirably be used. In this form of the invention, eared clamps 54 and 55 are secured in vertically spaced relation to the column 17 with the upper ends of legs 56 pivotally secured to the ears of clamp 54. The lower ends of the legs having foot members 57 pivotally secured thereto, and the foot members are apertured for passage of ground-engaging retaining stakes 58. Adjustable braces 59 are pivotally connected at opposite ends thereof to the legs 56 and clamp 55. The adjustable braces not only provide for varying the angles between the legs and column 17, but provide further for collapse of the legs against the column for convenient transporting of the structure.

For greater stability under strong wind conditions a long bar or cable 60 may be used with its upper end connected with a third clamp 61 on column 17 and its lower end secured by means of a stake 62.

As indicated in Fig. 8 a support or platform P is disposed for receiving the wing W when tipped into a vertical position, as is indicated in dotted lines.

It should be appreciated from the foregoing disclosure that a jack and supporting table construction is provided in accordance with this invention which is well adapted for handling airplane wings or the like expeditiously and without any attendant danger of injury to the wings.

While I have herein disclosed a specific form of screw jack, nevertheless it is to be understood that the wing supporting table may be raised by means of various other forms of screw jacks as well as by hydraulic, pneumatic, or the like lifting devices.

Furthermore, it is to be understood that the improved supporting table and jack construction will find ready application in the removal of wings, etc. from construction jigs and forms as well as for transporting and holding wings, etc. on the rolling jacks in factories, repair shops, and on fields during various stages of their construction or repair.

While I have also disclosed certain other specific embodiments of my invention, such are to be considered as illustrative and not restrictive, the scope of the invention being defined in the subjoined claims.

What I claim and desire to secure by U. S. Letters Patent is:

1. A supporting table and jack for use with airplane wings and the like comprising a vertically disposed adjustable column, and a normally substantially horizontal table pivotally supported by the column, the pivotal support providing for bodily adjustment of the table axially of the pivot.

2. A supporting table and jack for use in the assembling and disassembling of airplane wings or the like comprising a vertically disposed adjustable column having a horizontal extension on the upper end thereof, and a normally substantially horizontal table pivotally supported on the extension and horizontally adjustable relative thereto.

3. A supporting table and jack for use in the assembling and disassembling of airplane wings or the like comprising a vertically disposed adjustable column having a horizontal extension on the upper end thereof, and an elongated table extending longitudinally of the extension and pivotally connected intermediate its ends adjacent the free end of the extension.

4. A supporting table and jack for use in the assembling and disassembling of airplane wings or the like comprising a vertically disposed adjustable column having a horizontal extension on the upper end thereof, an elongated table pivotally connected intermediate its ends adjacent the free end of the extension, and a rod adjustably connecting one end of the table with the column for holding the table at any adjusted angle relative to said column upon being swung on said pivotal connection.

5. The structure according to claim 4, wherein said table is adjustable transversely and longitudinally thereof relative to said column.

6. A supporting table and jack for use in the assembling and disassembling of airplane wings and the like comprising a vertically disposed adjustable column, a horizontal extension on the upper end of the column, a bifurcated bearing member supported by the free end of the extension, a nut supported in the bifurcation of the bearing member, a screw extending transversely of the extension and through said nut and having its opposite ends rotatably supported in said bearing member, and an elongated table extending in the direction of said extension and adjustably connected to said nut.

7. The structure according to claim 6, wherein said connection of the table with the nut comprises a second screw extending lengthwise of the table and through said nut and having its opposite ends rotatably supported in said table.

8. The structure according to claim 6, wherein said table comprises a frame having spaced wing supporting pads thereon.

9. The structure according to claim 6, wherein said column comprises upper and lower telescoping tubular sections, the lower section being supported on a transportable base, and a jack for raising and lowering said upper section.

10. A supporting table and jack for use in assembling and disassembling of airplane wings and the like comprising a vertically adjustable column, an elongated table pivotally supported intermediate its ends on the upper end of the column, collapsible legs pivotally connected with the column, and adjustable braces pivotally interconnecting the column and legs.

11. Mechanism for supporting, loading, and transporting airplane wings comprising a vertically adjustable column, an elongated table pivotally connected intermediate its ends with the upper end of the column, and a transportable support having opposed wing supporting faces converging upwardly toward each other for receiving a pair of wings, said table being normally substantially horizontal intermediate the upper and lower ends of said support whereby upon swinging of said table with a wing thereon about said pivotal connection successively at opposite sides of the support a wing is disposed on each of said faces.

12. The structure according to claim 11, wherein said table and each of said faces is provided with spaced non-abrasive pads.

THOMAS W. MURRAY.